W. J. JOSEPH.
HOBBY HORSE.
APPLICATION FILED NOV. 23, 1909.
967,641.
Patented Aug. 16, 1910.
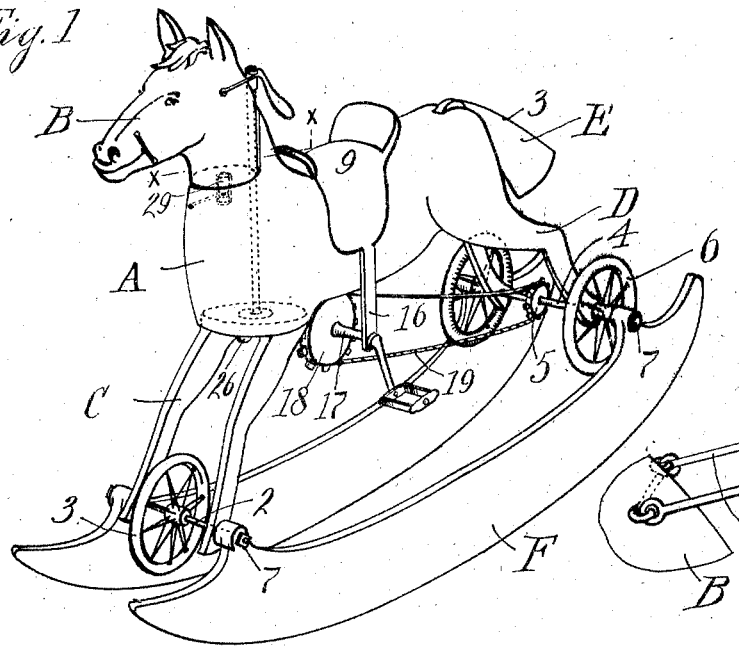
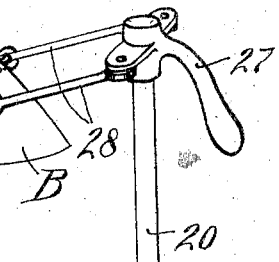
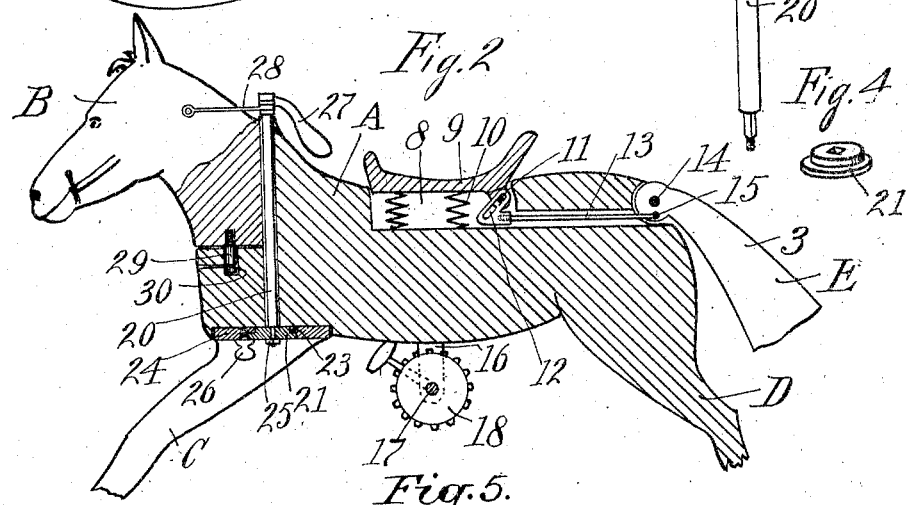
WITNESSES:
George Voelker
H. Smith
INVENTOR
William J. Joseph
BY Lothrop & Johnson
ATTORNEYS

UNITED STATES PATENT OFFICE.

WILLIAM J. JOSEPH, OF ST. PAUL, MINNESOTA.

HOBBY-HORSE.

967,641.

Specification of Letters Patent. Patented Aug. 16, 1910.

Application filed November 23, 1909. Serial No. 529,550.

*To all whom it may concern:*

Be it known that I, WILLIAM J. JOSEPH, a citizen of the United States, residing at St. Paul, in the county of Ramsey and State of Minnesota, have invented certain new and useful Improvements in Hobby-Horses, of which the following is a specification.

My invention relates to improvements in hobby horses, and has for its object to provide an artificial horse which can be used interchangeably as a rocking horse or velocipede, and which is constructed of movable parts which can be worked to simulate the actions of a live horse.

To this end the invention consists in the construction, combination and arrangement of parts hereinafter described and claimed.

In the accompanying drawings forming part of this specification, Figure 1 is a perspective view of an artificial horse embodying the invention, Fig. 2 is a view of the horse shown partly in side elevation and partly in longitudinal section through the middle thereof, with the legs partly broken away; Fig. 3 is a perspective detail of the steering and head turning mechanism; Fig. 4 is a detail of the annular disk at the lower end of the steering rod; and Fig. 5 is a horizontal section on line $x-x$ of Fig. 1.

In the drawings A represents the body of the horse, B the head, C the front legs, D the hind legs, and E the tail. In the lower ends of the front legs is journaled an axle 2 upon which is centrally mounted an idler wheel 3, while in the lower ends of the hind legs is journaled an axle 4 upon which is centrally secured a sprocket wheel 5. Upon the rear axle are carried two driving wheels 6. Both axles extend beyond the legs and have journal support in the rockers F, which are held upon the axle by means of nuts 7, and extend down below the wheels.

The body of the horse is formed at the top with a cavity 8 within which is elastically seated a saddle 9, the saddle resting upon springs 10. Upon the underside of the saddle is a transverse pin 11 which works slidingly in the downwardly and forwardly extending slot 12 of a rod 13. This rod works freely back and forth in a rearwardly extending hole in the body of the horse, and is pivotally secured to the tail 3 thereof. The tail is mounted upon a horizontal pivot 14, so as to oscillate in a vertical plane, and is worked by means of the rod 13, the end of which is eccentrically pivoted thereto at 15. Thus when the saddle is depressed the pin 11, as it moves up and down in the oblique slot 12, will reciprocate the rod 13 and thereby oscillate the tail.

Rotatable in a vertical hole extending down through the body of the horse in front of the saddle is a steering rod 20 which is detachably connected at the bottom with an annularly notched disk 21, which fits within the central hole, and against the interior flange 23, of a rotatable plate 24. Thus the flange 23 of the plate rests upon, and is supported by, the disk 20. The disk is detachably held upon the lower end of the steering rod by means of a nut 25 threaded upon the end of the rod. The plate can be clamped fast to the disk by means of a thumb screw 26, so that both plates will turn together. The fore legs C of the horse are integral with the plate 24, or secured fixedly thereto, so that when the plate is turned, the legs of the horse and the idler wheel 3 carried thereby, will be turned with it. At its upper end the steering rod is provided with a handle bar 27, which is pivotally connected with the head of the horse by means of links 28. The head of the horse is provided at the bottom with a central downwardly extending pivot pin 29, which works rotatably within a socket 30 in the body of the horse.

Journaled in the supports 16, which extend downwardly from the saddle, is crank shaft 17, upon which is a sprocket wheel 18, which is operatively connected with the rear sprocket wheel 5 by means of a chain 19.

When the horse is to be used as a rocking horse the rockers are slipped over the axles, as shown in Fig. 1, the wheels being thereby raised from the ground. The rider may or may not drive the back wheels, as he pleases. By loosening the thumb screw 26, so as to release the disk 21 from the plate 24, he can turn the rod and the horse's head independently of the front legs. Also by simulating the motion of a horse in action, he can work the saddle up and down and thereby move the horse's tail in the manner described. When the rockers are taken off, the horse will rest upon the wheels 3 and 6, and the wheels 6 can then be driven as in a velocipede by means of the crank shaft and sprocket mechanism above described.

I claim as my invention:

1. In a hobby horse, the combination, with a horse body having its fore legs and head rotatable upon vertical axes, of a rotatable steering rod secured to the head and passing down rotatably through the horse body, means for operatively connecting the rod with the fore legs and for releasing the same from such connection, whereby the head can be turned in unison with the legs or independently thereof, and interchangeable rocker and wheel support for said horse.

2. In a toy horse, the combination, with the body of the horse, of a tail pivotally supported thereon, a movable saddle having spring support upon the horse-body, and means carried by the saddle and connected with the tail for swinging the tail.

3. In a toy horse, the combination, with the horse-body, of a tail pivotally supported thereon, a movable saddle having spring support upon the horse body, and a rod having oblique slot and pin engagement with the saddle and being eccentrically connected with the tail, said rod passing loosely through a longitudinal hole in the horse body, whereby the tail will be swung when the saddle is moved.

4. In a hobby horse, the combination, with the body of the horse, of a tail pivotally supported thereon, a cavity in the top of the horse body, an elastically supported saddle working in said cavity, and mechanism actuated by the movement of the saddle and eccentrically connected with the tail whereby the tail will be swung when the saddle is reciprocated.

In testimony whereof I affix my signature in presence of two witnesses.

WILLIAM J. JOSEPH.

Witnesses:
ARTHUR P. LOTHROP,
H. SMITH.